United States Patent
Zhang

(10) Patent No.: US 9,824,663 B2
(45) Date of Patent: Nov. 21, 2017

(54) WAVEFORM-SHAPING CIRCUIT FOR TRIMMING RISING EDGE OF SCANNING SIGNAL, LIQUID CRYSTAL DISPLAY DEVICE HAVING THE SAME, AND DRIVING METHOD FOR THE SAME

(71) Applicant: Shenzhen China Star Optoelectronics Technology Co., Ltd., Shenzhen, Guangdong (CN)

(72) Inventor: Hua Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 203 days.

(21) Appl. No.: 14/783,407

(22) PCT Filed: Aug. 28, 2015

(86) PCT No.: PCT/CN2015/088372
§ 371 (c)(1),
(2) Date: Oct. 8, 2015

(87) PCT Pub. No.: WO2017/020380
PCT Pub. Date: Feb. 9, 2017

(65) Prior Publication Data
US 2017/0169787 A1    Jun. 15, 2017

(30) Foreign Application Priority Data
Jul. 31, 2015  (CN) .......................... 2015 1 0464364

(51) Int. Cl.
*G09G 3/36* (2006.01)
*G02F 1/1368* (2006.01)
*G02F 1/1362* (2006.01)

(52) U.S. Cl.
CPC ......... *G09G 3/3696* (2013.01); *G02F 1/1368* (2013.01); *G02F 1/136286* (2013.01);
(Continued)

(58) Field of Classification Search
CPC ....................................................... G09G 3/36
See application file for complete search history.

(56) References Cited

U.S. PATENT DOCUMENTS 6,421,038 B1 * 7/2002 Lee ...................... G09G 3/3677
345/87
9,159,289 B2   10/2015 Han
(Continued)

FOREIGN PATENT DOCUMENTS

CN    102881272 A    1/2013
CN    103198804 A    7/2013
(Continued)

*Primary Examiner* — Sanghyuk Park
(74) *Attorney, Agent, or Firm* — Andrew C. Cheng

(57) ABSTRACT

A waveform-shaping circuit, a liquid crystal display device having the same, and a driving method for the same are provided. The device includes a pixel unit, a data line for transmitting a data signal to the pixel unit, a clock signal generation chip for generating a first clock signal and a second clock signal, a waveform-shaping circuit connected with the clock signal generation chip for receiving the first clock signal and the second clock signal, outputting a scanning signal having a trimmed rising edge as a chamfered waveform according to the first clock signal and the second clock signal, and a scanning signal for transmitting the scanning signal having the trimmed rising edge to the pixel unit. The present invention can reduce the waveform difference of the scanning signals at two sides and a middle portion of a panel in order to increase the display quality of the device.

6 Claims, 3 Drawing Sheets

(52) U.S. Cl.
CPC ......... *G09G 3/3677* (2013.01); *G09G 3/3688* (2013.01); *G02F 2201/123* (2013.01); *G02F 2203/26* (2013.01); *G09G 2300/0426* (2013.01); *G09G 2310/0289* (2013.01); *G09G 2310/06* (2013.01); *G09G 2310/08* (2013.01)

(56) References Cited

U.S. PATENT DOCUMENTS

| | | | |
|---|---|---|---|
| 2009/0102775 A1* | 4/2009 | Ku | G09G 3/3648 345/92 |
| 2011/0169796 A1 | 7/2011 | Guo | |
| 2014/0340291 A1 | 11/2014 | Wang | |

FOREIGN PATENT DOCUMENTS

| CN | 103247280 A | 8/2013 |
|---|---|---|
| CN | 203118407 U | 8/2013 |
| CN | 2013179487 U | 9/2013 |

\* cited by examiner

WAVEFORM-SHAPING CIRCUIT FOR TRIMMING RISING EDGE OF SCANNING SIGNAL, LIQUID CRYSTAL DISPLAY DEVICE HAVING THE SAME, AND DRIVING METHOD FOR THE SAME

BACKGROUND OF THE INVENTION

1. Field of the Invention

The present invention relates to a display technology field, and more particularly to a waveform-shaping circuit, a liquid crystal display device having the same, and a driving method for the same.

2. Description of Related Art

Currently, in a Thin-Film-Transistor Liquid-Crystal-Display (TFT-LCD), a scanning line is used for transmitting a scanning signal to a thin film transistor in order to turn on the thin film transistor. A data line is used for transmitting a data signal to a pixel unit when the thin film transistor is turned on in order to charge the pixel unit and control a display of the pixel unit. Wherein, the pixel units can respectively display a red color, a green color, and a blue color.

With reference to FIG. 1, FIG. 1 is a waveform diagram of scanning signals at two sides and a middle portion of a same panel in the conventional art. FIG. 2 and FIG. 3 are a schematic structure diagram and timing control waveform diagram of scanning signals in the conventional art. Through a rising edge of a first clock signal to trigger a rising edge of the scanning signal, and through a rising edge of a second clock signal to trigger a falling edge of the scanning signal. As shown in FIG. 1, in a liquid crystal display device of the conventional art, the scanning signal is affected by resistors and capacitors, and a originally normal scanning signal will deform such that a waveform (waveform A) of a scanning signal at two sides of a panel and a waveform (waveform B) of a scanning signal at middle portion of the panel are obviously different. Therefore, conduction times of all thin film transistors in each row exist greater difference so as to generate a display difference and serious affect the display quality of a TFT-LCD.

SUMMARY OF THE INVENTION

The main technology problem solved by the present invention is to provide a waveform-shaping circuit, a liquid crystal display device having the same, and a driving method for the same, which is capable of reducing the waveform difference of the scanning signals at two sides and a middle portion of a panel in order to increase the display quality of the device.

In order to solve the above technology problem, a technology solution adopted by the present invention is: a liquid crystal display device, comprising: a pixel unit; a data line for transmitting a data signal to the pixel unit; a clock signal generation chip for generating a first clock signal and a second clock signal; a waveform-shaping circuit connected with the clock signal generation chip for receiving the first clock signal and the second clock signal, outputting a scanning signal having a trimmed rising edge as a chamfered waveform according to the first clock signal and the second clock signal; and a scanning signal for transmitting the scanning signal having the trimmed rising edge to the pixel unit.

Wherein, the pixel unit includes a thin film transistor and a pixel electrode; the thin film transistor includes a gate electrode, a source electrode and a drain electrode; the pixel electrode is connected with the drain electrode, the scanning line is connected with the gate electrode for transmitting the scanning signal having the trimmed rising edge to the gate electrode in order to control the thin film transistor to be turned on; the data line is connected with the source electrode in order to transmit a data signal to the pixel electrode through the source electrode when the thin film transistor is turned on.

Wherein, the trimmed rising edge of the scanning signal is inclined to from an inclined portion.

Wherein, the inclined portion is inclined upward from a low voltage level to a high voltage level of the scanning signal having the trimmed rising edge.

Wherein, the waveform-shaping circuit includes a voltage level shift chip, a resistor and a capacitor; a first input lead of the voltage level shift chip is used for receiving the first clock signal, and a second input lead of the voltage level shift chip is used for receiving the second clock signal; a scanning signal output lead of the voltage level shift chip is used for outputting a scanning signal to the scanning line; a delay lead of the voltage level shift chip is connected to a ground sequentially through the resistor and the capacitor.

Wherein, the voltage level shift chip includes a first rising edge detection circuit, a falling edge detection circuit, a second rising edge detection circuit, a first to a third N-type metal oxide semiconductor (MOS) transistors, a first voltage generator and a second voltage generator; wherein, an output voltage of the first voltage generator is greater than an output voltage of the second voltage generator, an input terminal of the first rising edge detection circuit is connected with the first input lead, an output terminal of the first rising edge detection circuit is connected with a gate electrode of the first N-type MOS transistor, a drain electrode of the first N-type MOS transistor is connected with the delay lead of the voltage level shift chip, a source electrode of the first N-type MOS transistor is connected with the scanning signal output lead of the voltage level shift chip, an input terminal of the falling edge detection circuit is connected with the first input lead, an output terminal of the falling edge detection circuit is connected with a gate electrode of the second N-type MOS transistor, a drain electrode of the second N-type MOS transistor is connected with the first voltage generator, a source electrode of the second N-type MOS transistor is connected with the source electrode of the first N-type MOS transistor and the scanning signal output lead of the voltage level shift chip; an input terminal of the second rising edge detection circuit is connected with the second input lead, an output terminal of the second rising edge detection circuit is connected with a gate electrode of the third N-type MOS transistor, a drain electrode of the third N-type MOS transistor is connected with the second voltage generator, a source electrode of the third N-type MOS transistor is connected with the source electrode of the first N-type MOS transistor, the source electrode of the second N-type MOS transistor, and the scanning signal output lead of the voltage level shift chip; the first rising edge detection circuit and the falling edge detection circuit are connected, the falling edge detection circuit and the rising edge detection circuit are connected.

Wherein, an inclination of the scanning signal having the trimmed rising edge is controlled through adjusting a time period between a rising edge and a falling edge of the first clock signal.

In order to solve the above technology problem, another technology solution adopted by the present invention is: a waveform-shaping circuit, comprising a voltage level shift chip having a first input lead, a second input lead, a scanning signal output lead and a delay lead; a resistor; and a capacitor; wherein, the first input lead of the voltage level shift chip is used for receiving a first clock signal, the second input lead of the voltage level shift chip is used for receiving a second clock signal, the scanning signal output lead of the voltage level shift chip is used for outputting a scanning signal, and a delay lead of the voltage level shift chip is connected to a ground sequentially through the resistor and the capacitor.

Wherein, the voltage level shift chip includes a first rising edge detection circuit, a falling edge detection circuit, a second rising edge detection circuit, a first to a third N-type metal oxide semiconductor (MOS) transistors, a first voltage generator and a second voltage generator; wherein, an output voltage of the first voltage generator is greater than an output voltage of the second voltage generator, an input terminal of the first rising edge detection circuit is connected with the first input lead, an output terminal of the first rising edge detection circuit is connected with a gate electrode of the first N-type MOS transistor, a drain electrode of the first N-type MOS transistor is connected with the delay lead of the voltage level shift chip, a source electrode of the first N-type MOS transistor is connected with the scanning signal output lead of the voltage level shift chip, an input terminal of the falling edge detection circuit is connected with the first input lead, an output terminal of the falling edge detection circuit is connected with a gate electrode of the second N-type MOS transistor, a drain electrode of the second N-type MOS transistor is connected with the first voltage generator, a source electrode of the second N-type MOS transistor is connected with the source electrode of the first N-type MOS transistor and the scanning signal output lead of the voltage level shift chip; an input terminal of the second rising edge detection circuit is connected with the second input lead, an output terminal of the second rising edge detection circuit is connected with a gate electrode of the third N-type MOS transistor, a drain electrode of the third N-type MOS transistor is connected with the second voltage generator, a source electrode of the third N-type MOS transistor is connected with the source electrode of the first N-type MOS transistor, the source electrode of the second N-type MOS transistor, and the scanning signal output lead of the voltage level shift chip; the first rising edge detection circuit and the falling edge detection circuit are connected, the falling edge detection circuit and the rising edge detection circuit are connected.

In order to solve the above technology problem, another technology solution adopted by the present invention is: a driving method for a liquid crystal display device, comprising steps of: providing a scanning signal; trimming a rising edge of the scanning signal to obtain a scanning signal having a trimmed rising edge as a chamfered waveform; and outputting the scanning signal having the trimmed rising edge to a scanning line.

The beneficial effects of the present invention are: comparing to the conventional art, the present invention trims the rising edge of each scanning signal in order to obtain a scanning signal having a trimmed rising edge, then, the scanning signal having a trimmed rising edge is transmitted to the pixel unit such that the waveform difference of the scanning signals at two sides and a middle portion of a panel is reduced in order to increase the display quality of the device.

DETAILED DESCRIPTION OF THE PREFERRED EMBODIMENT

Figure 1:
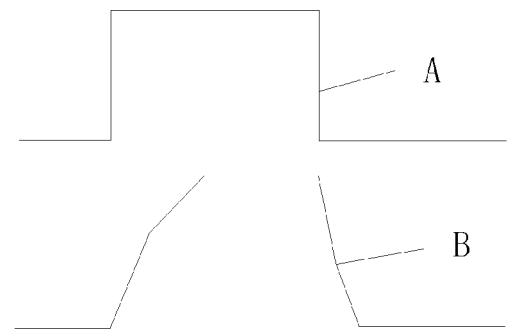
FIG. 1 is a waveform diagram of scanning signals at two sides and a middle portion of a same panel in the conventional art.
Figure 2:
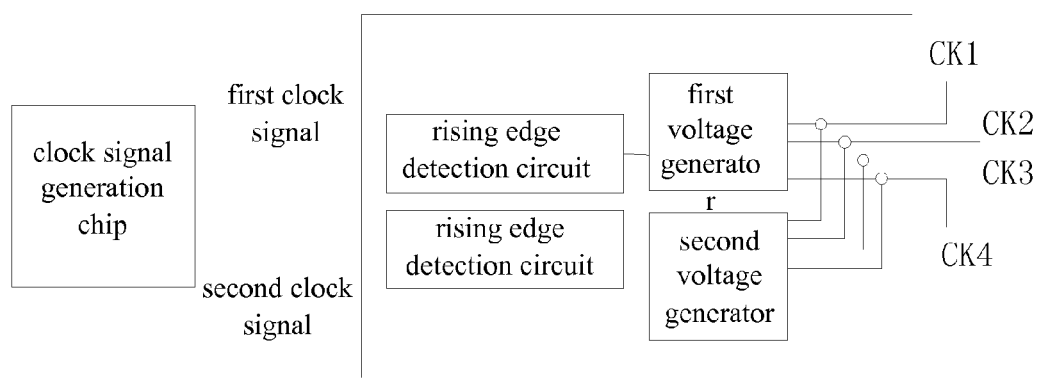
FIG. 2 is a schematic structure diagram of a liquid crystal display device in the conventional art.
Figure 3:
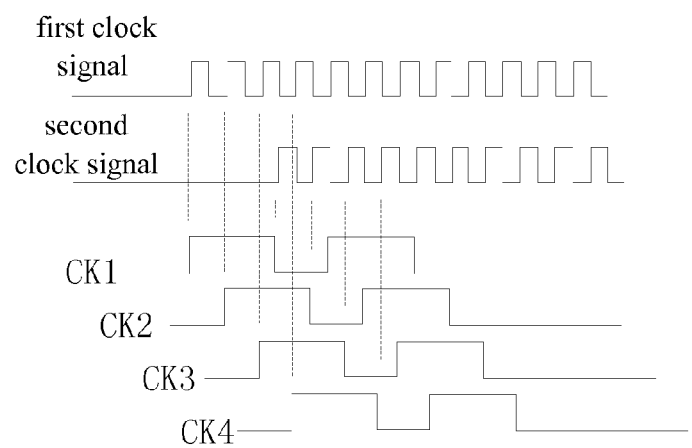
FIG. 3 is a timing control waveform diagram of scanning signals in the conventional art.
Figure 4:
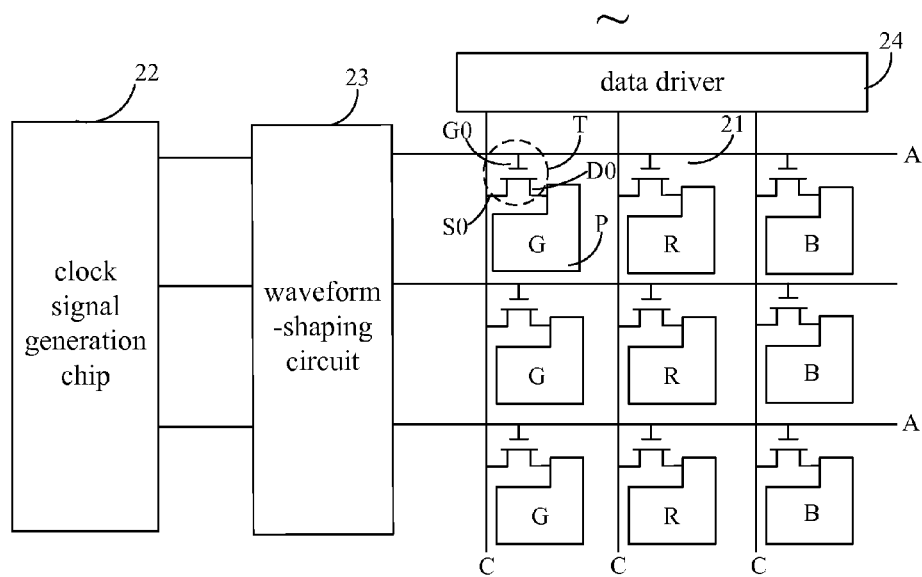
FIG. 4 is a schematic structure diagram of a liquid crystal display device of the present invention.

With reference to FIG. 4, and FIG. 4 is a schematic structure diagram of a liquid crystal display device of the present invention. As shown in FIG. 4, a liquid crystal display device 20 includes multiple pixel units 21, a clock signal generation chip 22, a waveform-shaping circuit 23, a data driver 24, multiple scanning lines A and multiple data lines C. Wherein, the data driver 24 is used for generating data signals. The data lines C are connected with data driver 24 for transmitting data signals to the pixel units 21. The clock signal generation chip 22 is used for generating a first clock signal and a second clock signal. The waveform-shaping circuit 23 is connected with the clock signal generation chip 22 for receiving the first and the second clock signals and trimming a rising edge of a scanning signal in order to obtain a trimmed rising edge as a chamfered waveform according to the first and the second clock signals. The scanning line A is connected with the waveform-shaping circuit 23 for transmitting the scanning signal having the trimmed rising edge after trimming to the pixel unit 21.

Each pixel unit 21 includes a thin film transistor T and a pixel electrode P. The thin film transistor T includes a gate electrode G0, a source electrode S0 and a drain electrode D0. The scanning line A is connected with the gate electrode G0 for transmitting the scanning signal having the trimmed rising edge to the gate electrode G0 in order to control the thin film transistor T to be turned on. The data line C is connected with the source electrode S0 in order to transmit a data signal to the pixel electrode P through the source electrode S0 when the thin film transistor T is turned on.

In the present embodiment, a same scanning line drive multiple pixel units 21, and the multiple pixel units 21 respectively display green color G, a red color R and a blue color B shown in FIG. 4. When the scanning line A is transmitting a scanning signal, the multiple pixel units 21 driven by the same scanning line A are all turned on. At this time, multiple data lines C simultaneously transmitting data signals to corresponding pixel electrodes P of the pixel units 21 in order to charge the pixel units 21 displaying different colors. In the present embodiment, because the affection of resistors and capacitors in the liquid crystal display device 20, when the scanning signal is changed from a low voltage level to a high voltage level, a delay phenomenon is generated. Therefore, the present embodiment utilizes the waveform-shaping circuit 23 to trim the scanning signal in order to obtain a chamfered waveform. Specifically, the waveform-shaping circuit 23 is shown in FIG. 5.

Figure 5:
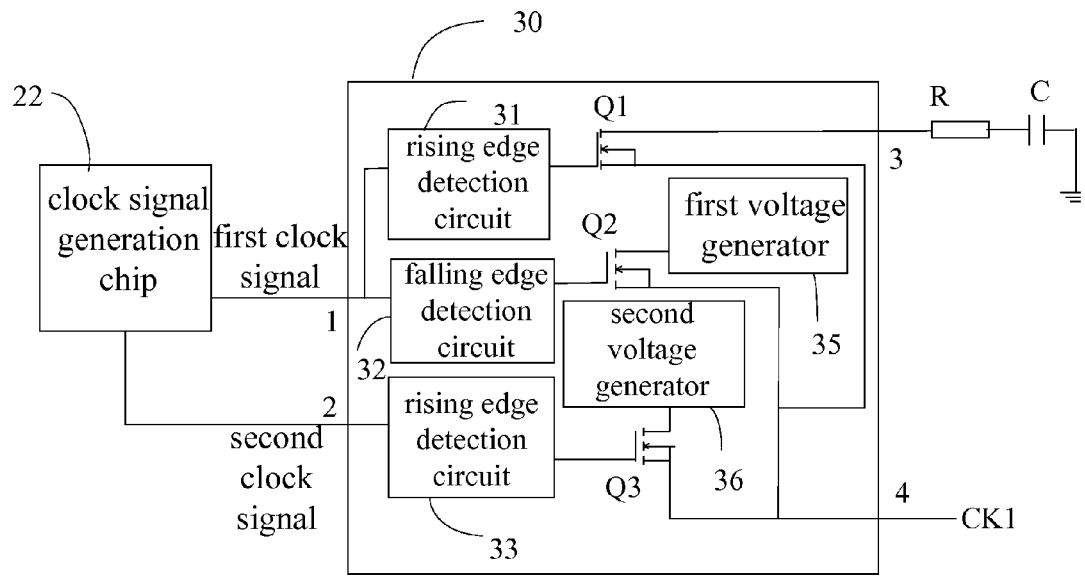
FIG. 5 is a circuit diagram of a waveform-shaping circuit of the present invention.

With reference to FIG. 5, the waveform-shaping circuit 23 includes a voltage level shift chip 30, a resistor R and a capacitor C. A first input lead 1 of the voltage level shift chip 30 is used for receiving the first clock signal, and a second input lead 2 of the voltage level shift chip 30 is used for receiving the second clock signal. A scanning signal output lead 4 of the voltage level shift chip 30 is used for outputting a scanning signal CK1 to a scanning line A, A delay lead 3 of the voltage level shift chip 30 is connected to a ground sequentially through the resistor R and the capacitor C. In the present embodiment, the waveform-shaping circuit 23 outputs multiple scanning signals such as CK1-CK4. Here, using the scanning signal CK1 as an example for illustrating.

The voltage level shift chip 30 includes a rising edge detection circuit 31, a falling edge detection circuit 32, a rising edge detection circuit 33, a first to a third N-type metal oxide semiconductor transistors Q1-Q3, a first voltage generator 35 and a second voltage generator 36. Wherein, an output voltage of the first voltage generator 35 is greater than an output voltage of the second voltage generator 36.

An input terminal of the rising edge detection circuit 31 is connected with first input lead 1. An output terminal of the rising edge detection circuit 31 is connected with a gate electrode of the N-type MOS transistor Q1. A drain electrode of the N-type MOS transistor Q1 is connected with the delay lead 3 of the voltage level shift chip 30. A source electrode of the N-type MOS transistor Q1 is connected with scanning signal output lead 4 of the voltage level shift chip 30. An input terminal of the falling edge detection circuit 32 is connected with the first input lead 1. An output terminal of the falling edge detection circuit 32 is connected with a gate electrode of the N-type MOS transistor Q2. A drain electrode of the N-type MOS transistor Q2 is connected with the first voltage generator 35. A source electrode of the N-type MOS transistor Q2 is connected with a source electrode of the N-type MOS transistor and the scanning signal output lead 4 of the voltage level shift chip 30.

An input terminal of the rising edge detection circuit 33 is connected with the second input lead 2. An output terminal of the rising edge detection circuit 33 is connected with a gate electrode of the N-type MOS transistor Q3. A drain electrode of the N-type MOS transistor Q3 is connected with the second voltage generator 36. A source electrode of the N-type MOS transistor Q3 is connected with the source electrode of the N-type MOS transistor Q1, the source electrode of the N-type MOS transistor Q2, and the scanning signal output lead 4 of the voltage level shift chip 30. The rising edge detection circuit 31 and the falling edge detection circuit 32 are connected. The falling edge detection circuit 32 and the rising edge detection circuit 33 are connected. In another embodiment, each of the first to the third MOS transistors Q1-Q3 may be other types of electric switches such as a triode or a P-type MOS transistor.

Then following will illustrate the operation principle for the waveform-shaping circuit 23 shown in FIG. 4 and FIG. 5:

In the present embodiment, when the clock signal generation chip 22 outputs a first clock signal and does not output a second clock signal, and a voltage level of the first clock signal is under a rising edge, the N-type MOS transistors Q1 and Q2 are turned on and the N-type MOS transistor Q3 is turned off. At this time, a scanning signal CK1 outputted from the scanning signal output lead 4 of the voltage shift chip 30 is in parallel with the resistor R and the capacitor C. An output voltage of the first voltage generator 35 charges the capacitor C through the resistor R. At this time, a rising edge of the scanning signal CK1 raises slowly;

When the clock signal generation chip 22 outputs a first clock signal and does not output a second clock signal, and a voltage level of the first clock signal is under a falling edge, the N-type MOS transistor Q1 is turned off, and the N-type MOS transistor Q2 is turned on continuously, and the N-type MOS transistor Q3 is turned off continuously. At this time, the scanning signal CK1 is directly connected with the first voltage generator 35 for receiving a stable high voltage; when the clock signal generation chip 22 outputs the second clock signal and does not output the first clock signal, and a voltage level of the second clock signal is under a rising edge, the N-type MOS transistors Q1 and Q2 are both turned off, and the N-type MOS transistor Q3 is turned on. At this time, the scanning signal CK1 is directly connected with the second voltage generator 36 for receiving a stable low voltage.

Figure 6:
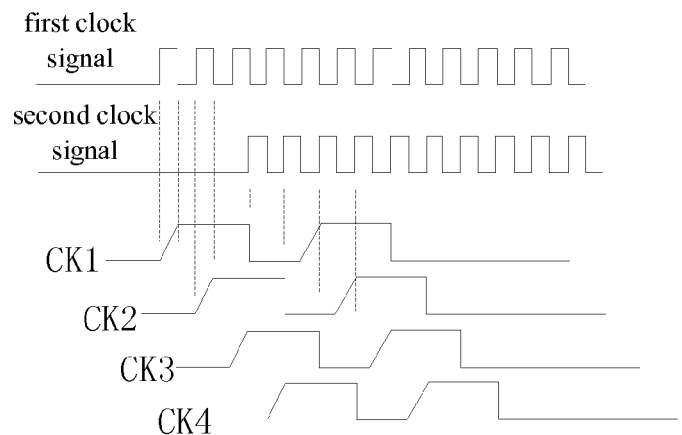
FIG. 6 is a waveform diagram of scanning signals after trimmed by the waveform-shaping circuit of the present invention.

With also reference to FIG. 6, and FIG. 6 is a waveform diagram of signals received by and outputted from the waveform-shaping circuit 23. Wherein, the clock signal generation chip 22 outputs the first and second clock signals to the waveform-shaping circuit 23, and after passing through the waveform-shaping circuit 23, each of scanning signals CK1-CK4 has a trimmed rising edge as a chamfered waveform. In the present embodiment, the rising edge of each of the scanning signals CK1-CK4 is inclined to form an inclined portion. The inclined portion is inclined upward from a low voltage level to a high voltage level of each of the scanning signals CK1-CK4.

In the present embodiment, an inclination of each of the scanning signals CK1-CK4 is controlled through adjusting a time period between a rising edge and a falling edge of the first clock signal. Specifically, when the time period between the rising edge and the falling edge of the first clock signal is longer, the inclination of the trimmed rising edge of each of the scanning signals CK1-CK4 is smaller. When the time period between the rising edge and the falling edge of the first clock signal is shorter, the inclination of the trimmed rising edge of each of the scanning signals CK1-CK4 is larger.

It should be noted that, the waveform-shaping circuit 23 only trims the rising edge of each of the scanning signals CK1-CK4. Therefore, a high voltage level and a low voltage of each of the scanning signals CK1-CK4 after being trimmed is the same as a high voltage level and a low voltage of each of the scanning signals CK1-CK4.

Therefore, waveforms of the rising edges of the scanning signals CK1-CK4 after being trimmed are similar or the same such that conduction times of the thin film transistors are similar or the same so that voltages being charged into the pixel units 21 are similar or the same. The brightness of the displayed colors of the pixel units 21 are similar or the same in order to reduce the color shift phenomenon and increase the display quality of the display device.

Figure 7:
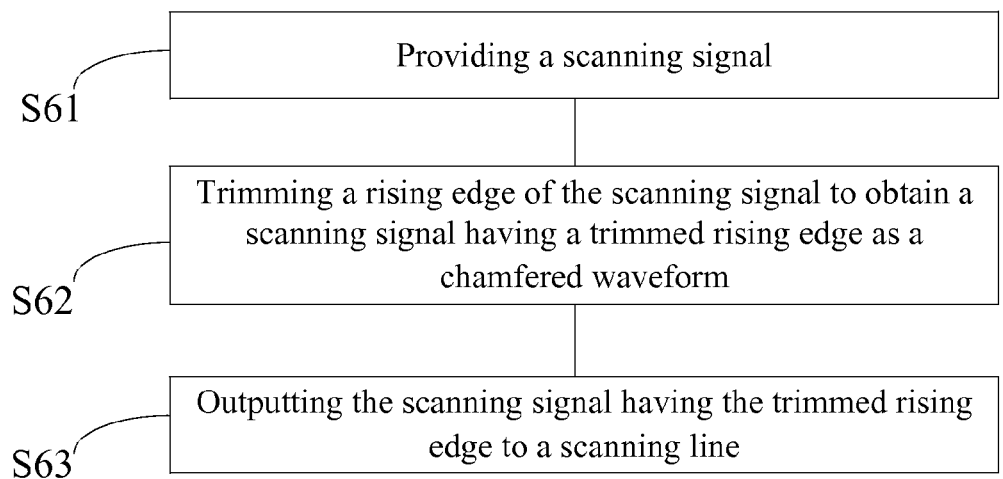
FIG. 7 is a flow chart of a driving method of the liquid crystal display device of the present invention.

With reference to FIG. 7, and FIG. 7 is a driving method for a liquid crystal display device, comprising steps of:

Step S61: providing a scanning signal;

Step S62: trimming a rising edge of the scanning signal to obtain a scanning signal having a trimmed rising edge as a chamfered waveform; and Step S63: outputting the scanning signal having the trimmed rising edge to a gate of a thin film transistor in order to turn on the thin film transistor.

When the thin film transistor is turned on, a data line transmits a data signal to a source electrode of the thin film transistor, and through the source electrode of the thin film transistor, the data signal is further transmitted to the pixel electrode. The pixel electrode displays a color according to the received data signal.

Because the present invention only trims the rising edge of each scanning signal, conduction times of the thin film transistors are similar or the same so that voltages being charged into the pixel units are similar or the same. The brightness of the displayed colors of the pixel units are similar or the same in order to reduce the color shift phenomenon and increase the display quality of the display device.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display device, comprising:
   a pixel unit;
   a data line for transmitting a data signal to the pixel unit;
   a clock signal generation chip for generating a first clock signal and a second clock signal;
   a waveform-shaping circuit connected with the clock signal generation chip for receiving the first clock signal and the second clock signal, outputting a scanning signal having a trimmed rising edge as a chamfered waveform according to the first clock signal and the second clock signal; and
   a scanning line for transmitting the scanning signal having the trimmed rising edge to the pixel unit;
   wherein, the waveform-shaping circuit includes a voltage level shift chip, a resistor and a capacitor; a first input lead of the voltage level shift chip is used for receiving the first clock signal, and a second input lead of the voltage level shift chip is used for receiving the second clock signal; a scanning signal output lead of the voltage level shift chip is used for outputting a scanning signal to the scanning line; a delay lead of the voltage level shift chip is connected to a ground sequentially through the resistor and the capacitor; and
   wherein, the voltage level shift chip includes a first rising edge detection circuit, a falling edge detection circuit, a second rising edge detection circuit, a first to a third N-type metal oxide semiconductor (MOS) transistors, a first voltage generator and a second voltage generator; wherein, an output voltage of the first voltage generator is greater than an output voltage of the second voltage generator;
   an input terminal of the first rising edge detection circuit is connected with the first input lead, an output terminal of the first rising edge detection circuit is connected with a gate electrode of the first N-type MOS transistor, a drain electrode of the first N-type MOS transistor is connected with the delay lead of the voltage level shift chip;
   a source electrode of the first N-type MOS transistor is connected with the scanning signal output lead of the voltage level shift chip, an input terminal of the falling edge detection circuit is connected with the first input lead, an output terminal of the falling edge detection circuit is connected with a gate electrode of the second N-type MOS transistor, a drain electrode of the second N-type MOS transistor is connected with the first voltage generator, a source electrode of the second N-type MOS transistor is connected with the source electrode of the first N-type MOS transistor and the scanning signal output lead of the voltage level shift chip; and
   an input terminal of the second rising edge detection circuit is connected with the second input lead, an output terminal of the second rising edge detection circuit is connected with a gate electrode of the third N-type MOS transistor, a drain electrode of the third N-type MOS transistor is connected with the second voltage generator, a source electrode of the third N-type MOS transistor is connected with the source electrode of the first N-type MOS transistor, the source electrode of the second N-type MOS transistor, and the scanning signal output lead of the voltage level shift chip; the first rising edge detection circuit and the falling edge detection circuit are connected, the falling edge detection circuit and the rising edge detection circuit are connected.

2. The liquid crystal display device according to claim 1, wherein, the pixel unit includes a thin film transistor and a pixel electrode; the thin film transistor includes a gate electrode, a source electrode and a drain electrode; the pixel electrode is connected with the drain electrode, the scanning line is connected with the gate electrode for transmitting the scanning signal having the trimmed rising edge to the gate electrode in order to control the thin film transistor to be turned on; the data line is connected with the source electrode in order to transmit a data signal to the pixel electrode through the source electrode when the thin film transistor is turned on.

3. The liquid crystal display device according to claim 1, wherein, the trimmed rising edge of the scanning signal is inclined to from an inclined portion.

4. The liquid crystal display device according to claim 3, wherein, the inclined portion is inclined upward from a low voltage level to a high voltage level of the scanning signal having the trimmed rising edge.

5. The liquid crystal display device according to claim 1, wherein, an inclination of the scanning signal having the trimmed rising edge is controlled through adjusting a time period between a rising edge and a falling edge of the first clock signal.

6. A waveform-shaping circuit, comprising
   a voltage level shift chip having a first input lead, a second input lead, a scanning signal output lead and a delay lead;
   a resistor; and
   a capacitor;
   wherein, the first input lead of the voltage level shift chip is used for receiving a first clock signal, the second input lead of the voltage level shift chip is used for receiving a second clock signal, the scanning signal output lead of the voltage level shift chip is used for outputting a scanning signal, and a delay lead of the voltage level shift chip is connected to a ground sequentially through the resistor and the capacitor;
   wherein, the voltage level shift chip includes a first rising edge detection circuit, a falling edge detection circuit, a second rising edge detection circuit, a first to a third N-type metal oxide semiconductor (MOS) transistors, a first voltage generator and a second voltage generator; wherein, an output voltage of the first voltage generator is greater than an output voltage of the second voltage generator, an input terminal of the first rising edge detection circuit is connected with the first input lead, an output terminal of the first rising edge detection circuit is connected with a gate electrode of the first N-type MOS transistor, a drain electrode of the first N-type MOS transistor is connected with the delay lead of the voltage level shift chip;
   a source electrode of the first N-type MOS transistor is connected with the scanning signal output lead of the voltage level shift chip, an input terminal of the falling edge detection circuit is connected with the first input lead, an output terminal of the falling edge detection circuit is connected with a gate electrode of the second N-type MOS transistor, a drain electrode of the second N-type MOS transistor is connected with the first voltage generator, a source electrode of the second N-type MOS transistor is connected with the source electrode of the first N-type MOS transistor and the scanning signal output lead of the voltage level shift chip; and an input terminal of the second rising edge detection circuit is connected with the second input lead, an output terminal of the second rising edge detection circuit is connected with a gate electrode of the third N-type MOS transistor, a drain electrode of the third N-type MOS transistor is connected with the second voltage generator, a source electrode of the third N-type MOS transistor is connected with the source electrode of the first N-type MOS transistor, the source electrode of the second N-type MOS transistor, and the scanning signal output lead of the voltage level shift chip; the first rising edge detection circuit and the falling edge detection circuit are connected, the falling edge detection circuit and the rising edge detection circuit are connected.

\* \* \* \* \*